(12) United States Patent
Williamson

(10) Patent No.: US 6,366,365 B1
(45) Date of Patent: Apr. 2, 2002

(54) WAVEGUIDE ARRAY-BASED IMAGE SENSOR FOR DOCUMENT SCANNER SCAN HEAD

(75) Inventor: James B. Williamson, Sunnyvale, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/140,089

(22) Filed: Aug. 26, 1998

(51) Int. Cl.⁷ .................................................. H04N 1/04
(52) U.S. Cl. ...................... 358/484; 250/208.4; 385/116
(58) Field of Search ................................. 358/484, 474, 358/500, 505, 400, 498; 250/208.4, 227.12; 385/116, 121, 120

(56) References Cited

U.S. PATENT DOCUMENTS

| 5,198,655 A | * | 3/1993 | Suetsugug .................. 250/208 |
| 5,322,986 A | * | 6/1994 | Nutt ........................... 219/121 |
| 5,716,556 A | | 2/1998 | Heard et al. ............... 264/1.24 |
| 5,747,796 A | * | 5/1998 | Heard ........................ 250/227 |
| 5,930,433 A | * | 7/1999 | Williamson ................. 385/116 |

FOREIGN PATENT DOCUMENTS

| EP | 0753958 A2 | 1/1997 |
| JP | 9-116692 A2 | 5/1997 |
| JP | 9-269429 A2 | 10/1997 |
| JP | 9-281351 A2 | 10/1997 |
| JP | 9-284473 A2 | 10/1997 |
| JP | 7-301730 A2 | 11/1997 |
| JP | 9-298627 A2 | 11/1997 |
| JP | 8-321596 A2 | 12/1997 |
| JP | 8-321914 A2 | 12/1997 |
| JP | 9-329721 A2 | 12/1997 |

* cited by examiner

*Primary Examiner*—Jerome Grant, II
*Assistant Examiner*—Negussie Worku
(74) *Attorney, Agent, or Firm*—Ian Hardcastle

(57) ABSTRACT

A scan head that comprises an elongate light source, an elongate light sensor array and a planar waveguide array The light source is disposed perpendicular to the scan direction. The light sensor array is disposed parallel to the light source. The planar waveguide array includes an input end and an output end, and is curved about an axis parallel to the light source. The input end is located to receive light from the light source reflected by the object. The output end is located adjacent the light sensor array. The waveguide array includes tapered waveguides linearly arrayed in an array direction parallel to the light source. Each of the waveguides has a width in the array direction that decreases towards the output end of the waveguide array.

23 Claims, 6 Drawing Sheets

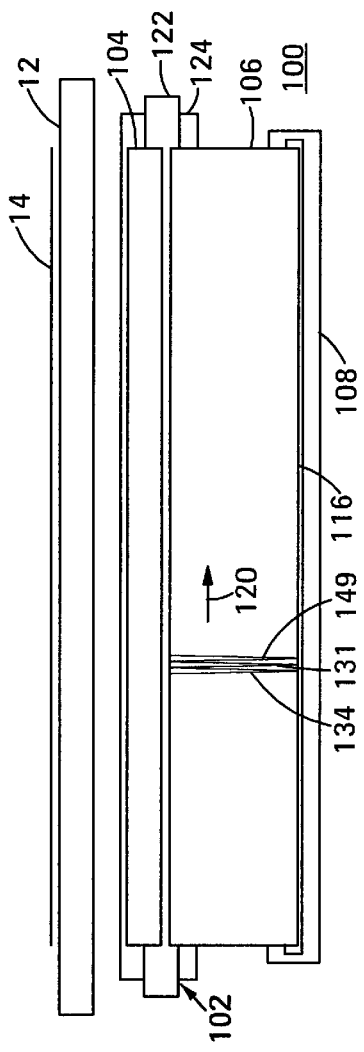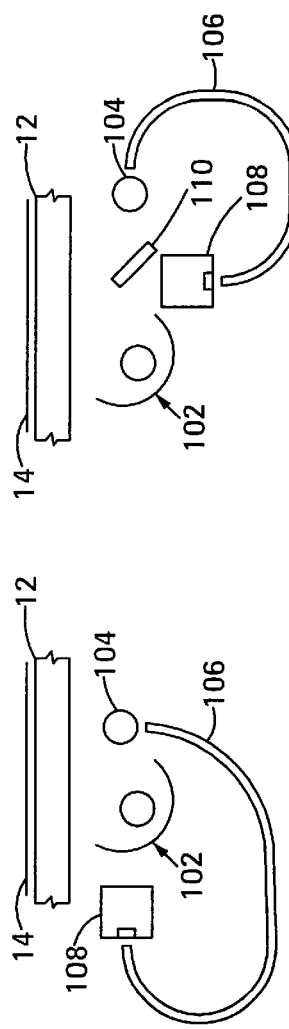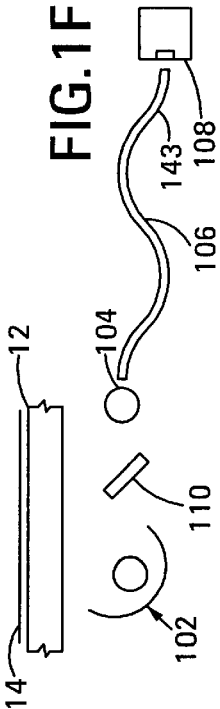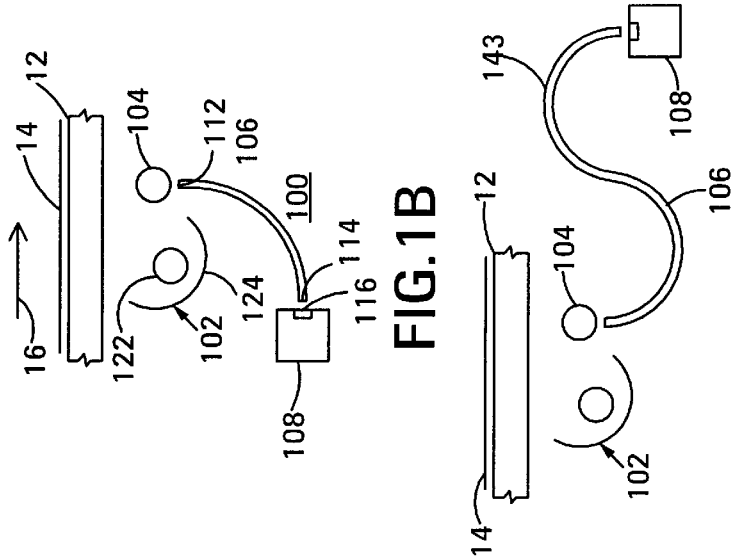

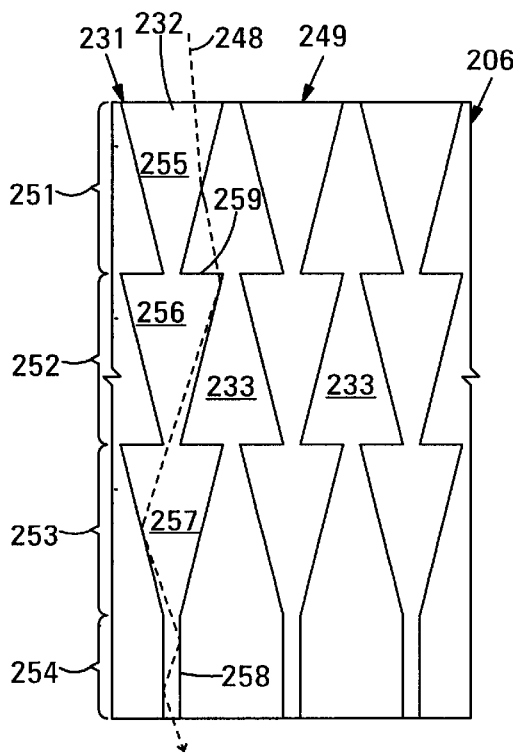
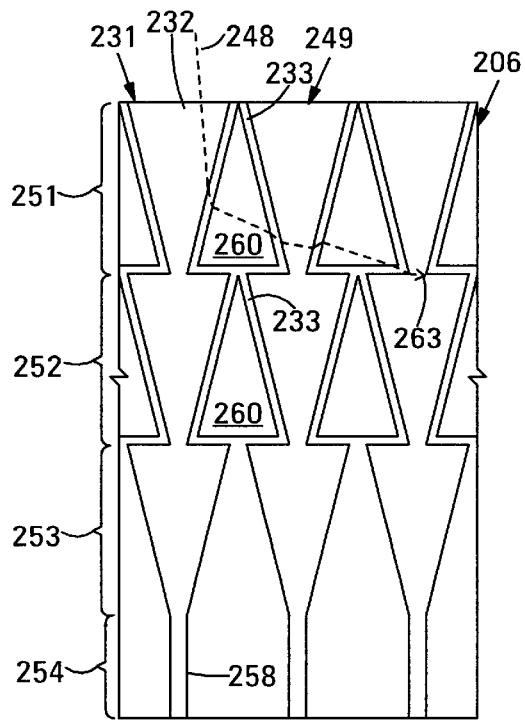
FIG.3A
FIG.3B
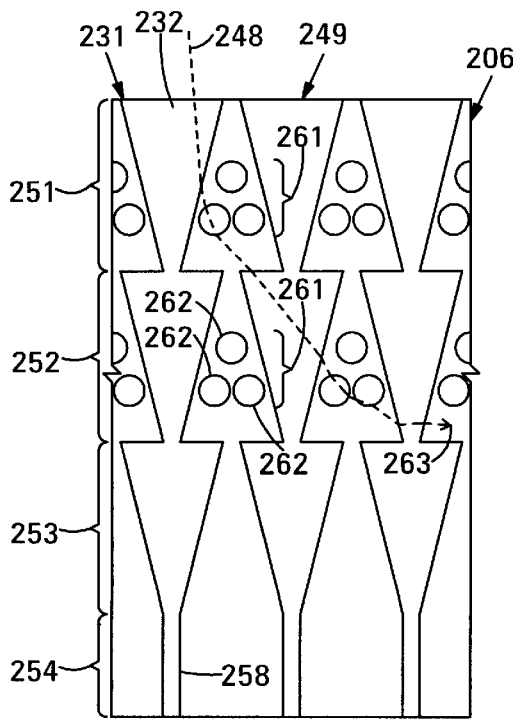
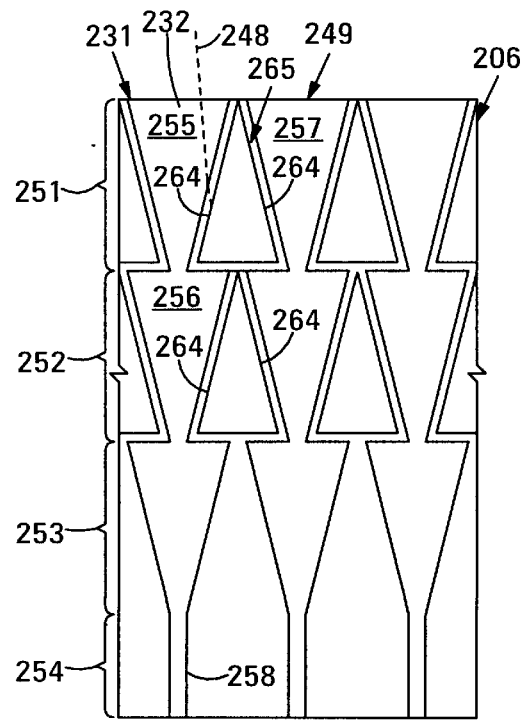
FIG.3C
FIG.3D

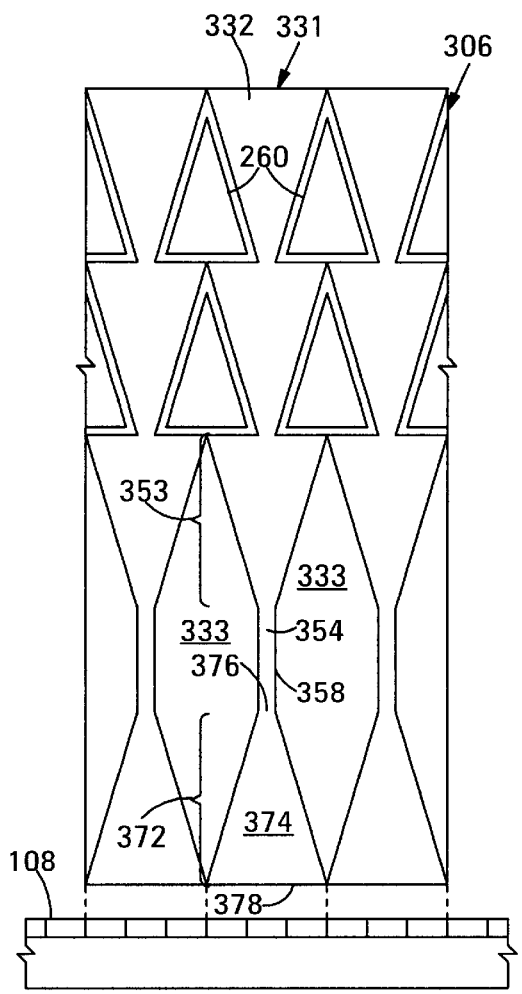
FIG.4B
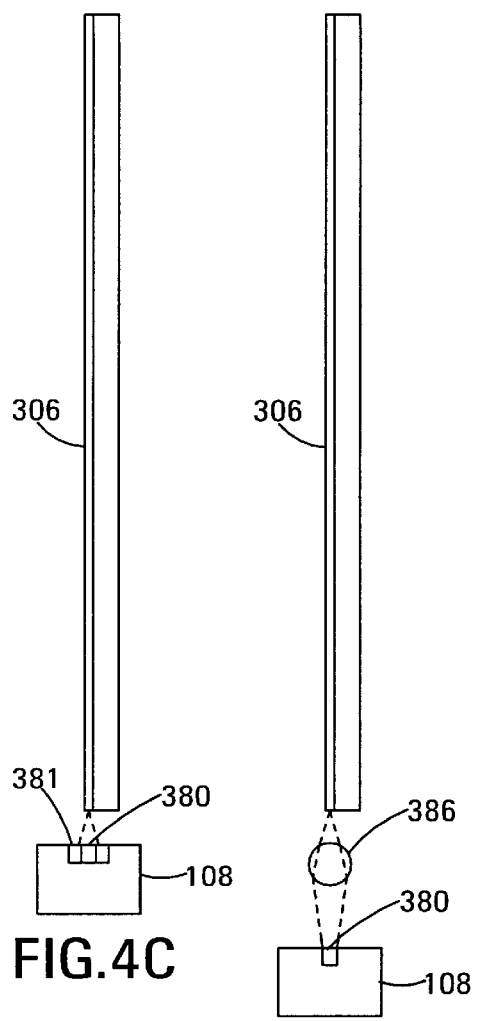
FIG.4C
FIG.4E
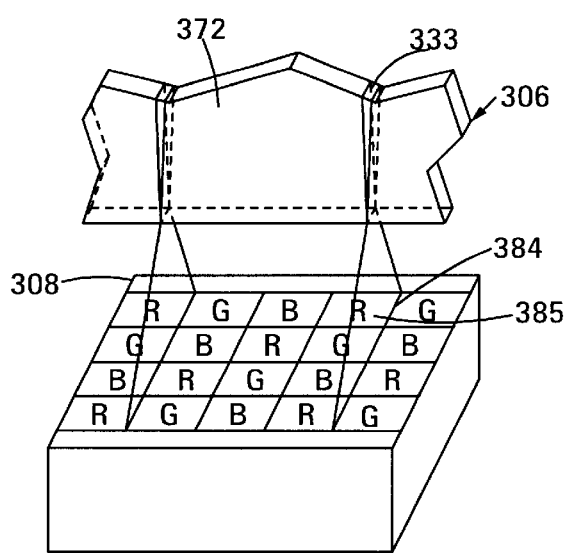
FIG.4D

WAVEGUIDE ARRAY-BASED IMAGE SENSOR FOR DOCUMENT SCANNER SCAN HEAD

FIELD OF THE INVENTION

The invention relates to an image sensor for a scan head usable in document scanners, facsimile machines, photocopiers and the like. In particular, the invention relates to an image sensor in which a waveguide array is used to transmit light from the scanned object to a light sensor array.

BACKGROUND OF THE INVENTION

Scanners generate an electrical signal in response to light reflected by an object being scanned (the object). The object is usually a piece of paper, but other kinds of object can be scanned. Facsimile machines and certain types of photocopier operate similarly. Such devices include a scan head in which the light reflected by object is transmitted to an array of light sensors that generates the electrical signal. The entire object is scanned by moving the scan head relative to the object or by moving the object relative to the scan head. The scan heads of older types of scanners use reduction optics composed of multiple lenses and mirrors to transmit the light reflected by the object to an array of silicon light sensors. Reduction optics have excellent optical characteristics, but are bulky, delicate, expensive and may require complex alignment during manufacture production. Moreover, in the common arrangement in which the scan head moves relative to the object, the bulk of the reduction optics increases the size of the enclosure in which the scan head moves, further increasing the size, mass and cost of the scanner.

The scan heads of an increasing number of scanners use a lens array based image sensor in which a linear array of gradient index lenses forms a 1:1 image of the object on a linear light sensor array substantially equal in width to the maximum scan width of the scanner. The number of sensor elements per unit length in the light sensor array is equal to the optical resolution of the scanner. For example, the light sensor array in a scanner having a optical resolution of 24 points/mm (600 dpi) has 24 light sensors/mm (600 light sensors/inch).

Many lens array-based scanners obtain color information by sequentially illuminating the object with red, green and blue light. Such light may be generated by a linear array of red, green and blue light-emitting diodes (LEDs), for example, disposed perpendicular to the scan direction of the scan head. Another type of lens array-based scanner scans the object three times. In each scan, the object is illuminated with light from a white light source filtered by a filter of a different color or by light generated by LEDs of a different color. Finally, lens array scanners may employ three light sensor arrays, each equipped with a color filter of a different color. In this case, the object can be scanned once using a white light source. However, the cost of providing three page-width light sensor arrays represents a substantial fraction of the component cost of the scanner.

Scanners that employ a scan head incorporating a lens array-based image sensor are considerably less bulky and weigh less than scanners that employ a scan head incorporating reduction optics but have a number of performance shortcomings. The type of lens array-based scanners that illuminate the object with light of three different colors have a slow scan speed. Some scanners require as long as two minutes to scan a single A4 page. Using the lens array to focus light reflected by the object onto the light sensor array reduces the depth of field of the scanner compared with that of a scanner that incorporates reduction optics. Depth of field values of about 0.33 mm are typical. Such a small depth of field is not usually a problem when the object is a flat piece of paper. However, when the object has depth, such a page of an open book, the image formed on the light sensor array of parts of the object displaced depthwise from the platen on which the object rests will be out of focus. Finally, the 220 mm wide light sensor array used in a typical lens array-based scanner is considerably more expensive than the smaller light sensor arrays used in scanners that incorporate reduction optics. The cost of the light sensor array represents a significant portion of the component cost of the scanner. This is especially so if three page-width light sensor arrays are used to increase the scan speed.

In United States patent application Ser. No. 08/898,935, the disclosure of which is incorporated into this application by reference, the applicant disclosed a scan head that uses a waveguide array to transmit the light reflected by an object to a light sensor array. However, versions of this scan head for use in scanners with an optical resolution of 24 points/mm (600 dpi) or 48 points/mm (1,200 dpi) are larger than comparable lens array-based scan heads.

Consequently, what is needed is a scan head that combines the compactness and low mass of known lens array-based scan heads, but that has a faster scan speed, a greater depth of field, and an optical resolution of at least 12 points/mm.

SUMMARY OF THE INVENTION

The invention provides a scan head for scanning an object in a scan direction. The scan head comprises an elongate light source, an elongate light sensor array and a planar waveguide array. The light source is disposed perpendicular to the scan direction. The light sensor array is disposed parallel to the light source. The planar waveguide array includes an input end and an output end, and is curved about an axis parallel to the light source. The input end is located to receive light from the light source reflected by the object. The output end is located adjacent the light sensor array. The waveguide array includes tapered waveguides linearly arrayed in an array direction parallel to the light source. Each of the waveguides has a width in the array direction that decreases towards the output end of the waveguide array.

The scan head may additionally comprise a rod lens disposed parallel to the light source. The rod lens is arranged to form an image of a narrow strip of the object on the input end of the waveguide array.

Each of the waveguides may include a tandem arrangement of tapered waveguide segments. Each of the waveguide segments has a width that progressively decreases towards the output end of the waveguide array.

The waveguide array may additionally include a layer of absorbent material adjacent a surface of the waveguide array that is convexly curved when the waveguide array is curved about the axis.

The invention also provides a waveguide array that comprises tapered waveguides linearly arrayed in an array direction. Each of the waveguides has a width that decreases between an input end and an output end, and includes a tandem arrangement of tapered waveguide segments. Each of the waveguide segments has a width that progressively decreases towards the output end of the waveguide.

BRIEF DESCRIPTION OF THE DRAWINGS

FIG. 1A is a front elevation of a waveguide array-based scan head according to the invention.

FIG. 1B is a side elevation of a waveguide array-based scan head according to the invention.

FIG. 1C–1F are side elevations showing alternative arrangements of the waveguide array and the light sensor array in the scan head according to the invention.

FIGS. 3A–3D show variations on a second embodiment of a waveguide array according to the invention that provides the smaller acceptance angles required by the scan heads of 600 dpi and 1,200 dpi scanners.

FIG. 4B is a front elevation showing a variation on the waveguide array according to the invention in which the waveguides each include a collimator to reduce the spread of the light output by the waveguide.

FIG. 4C is a side elevation of the embodiment of the waveguide array shown in FIG. 4D.

FIG. 4D shows an alternative embodiment of the light sensor array that can be used in the scan heads according to the invention.

FIG. 4E is a side elevation showing a second rod lens used to reduce the spread in the scan direction of light output by the waveguide array according to the invention.

DETAILED DESCRIPTION OF THE INVENTION

Figure 2A:
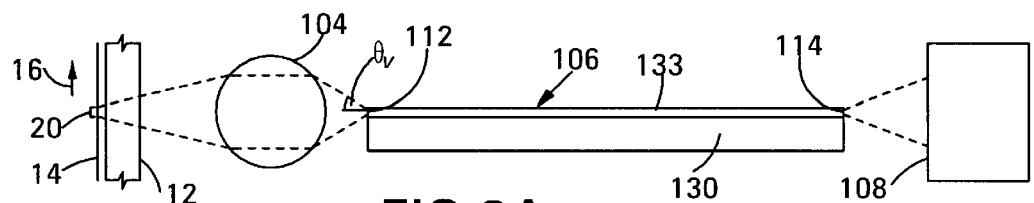
FIG. 2A is a side elevation of the scan head according to the invention incorporating a first embodiment of the waveguide array according to the invention. In this Figure, the curvature of the waveguide array has been omitted. and in FIGS. 2B, 3A–3D, 4A–4C, 4E and 5, the curvature of the waveguide array has been eliminated to show the shapes of the waveguides more clearly.

FIGS. 1A and 1B are respectively a front elevation and a side elevation showing the basic structure of a waveguide array-based scan head 100 according to the invention. The scan head shown is suitable for use in the scan heads of scanners with optical resolutions of 12, 24 and 48 points per millimeter. The scan head may also be used in scanners with optical resolutions greater than, less than, and different from those stated. In this disclosure, scanners with optical resolutions of 12, 24 and 48 points/mm will be referred to 300 dpi scanners, 600 dpi scanners and 1,200 dpi scanners, respectively, in accordance with their normal commercial appellations. Moreover, references in this disclosure to the resolution of a scanner or scan head should be taken to be references to the optical resolution of the scanner or scan head.

FIGS. 1A and 1B also show the location of the scan head 100 relative to the platen 12 of the scanner. The object 14 is placed on the platen so that it can be scanned by the scan head. In the example shown, the object is a flat object, such as a piece of paper or a photograph. However, the scan head 100 has an appreciable depth of field so that it is capable of scanning objects with some depth, such as a page of an open book. The object is shown displaced from the platen to enable the object to be distinguished from the platen in the drawing. In an actual scanner, the object rests on the platen.

In the scan head 100, a scan head body supports the elongate white light source 102, the rod lens 104, the waveguide array 106 and the light sensor array 108 parallel to one another. The scan head body has been omitted from the drawings so that the other components of the scan head can be shown more clearly. The elongate white light source 102 extends perpendicular to the scan direction 16 across the maximum scan width of the scanner, and is composed of the lamp 122 partially surrounded by the reflector 124. The lamp generates light that the reflector directs towards the platen 12 to illuminate a long, narrow strip of the object 14 disposed perpendicular to the scan direction. The elongate rod lens 104 is mounted in a location where it receives light reflected or scattered by the illuminated portion of the object. The rod lens focuses the reflected light on the input end 112 of the waveguide array 106 .

The waveguide array 106 is planar, and is composed of a large number of elongate waveguides arranged in a linear array disposed perpendicular to the scan direction. Exemplary waveguides are shown at 134, 131 and 149. The remaining waveguides have been omitted to simplify the drawing. The direction in which the waveguides are arrayed will be called the array direction 120. The waveguides are elongate in the direction perpendicular to the array direction. Each of the waveguides in the waveguide array conducts light from one picture element of the object to one picture element pixel) of the light sensor array 108. The waveguide array will be described in more detail below.

In the example shown in FIGS. 1A and 1B, the light sensor array 108 is oriented so that the plane of its light-sensitive surface 116 is approximately perpendicular to the platen 12. This orientation of the light-sensitive surface is required because the plane of the waveguide array is curved about an axis parallel to the array direction 120. Curving the waveguide array orients the output end 114 and the input end 112 of the waveguide array approximately perpendicular to one another. The preferred bending radius is in the range of approximately 10–15 mm. As will be described in detail below, curving the waveguide array as shown reduces crosstalk between the waveguides constituting the waveguide array, and thus enables the scan head 100 to have a high resolution. The depth in the scan direction 16 and the height of a practical embodiment of the scan head 100 are each about 25 mm .

The width of the light sensor array 108 is slightly larger than the maximum scan width of the scanner in which the scan head is mounted. In a typical scanner, the light sensor array is about 220 mm (8½ inches) wide. Since single-chip light sensor arrays of this width are not currently available at low cost, if at all, the light sensor array is segmented into light sensor array elements. In a typical scanner, the light sensor array elements number in the range of seven to 22. FIG. 1A shows the light sensor array unsegmented to simplify the drawing.

The light sensor array 108 is divided into pixels equal in number to the number of waveguides in the waveguide array 106. Each pixel is divided into at least three sub-pixels. Each of the sub-pixels is fitted with a color filter of a different primary color. This enables the light source 102 to incorporate a lamp 122 that generates white light, and enables the color information to be generated in a single scan of the scan head. This reduces the time required to scan an object of a given size. In the preferred embodiment, a cold-cathode fluorescent lamp (CCFL) was used as the lamp. A CCFL is currently brighter than a linear array of LEDs for a given cost. However, if relative component costs change, a linear array of LEDs or other type of elongate white light source can be substituted for the CCFL.

Figure 2B:
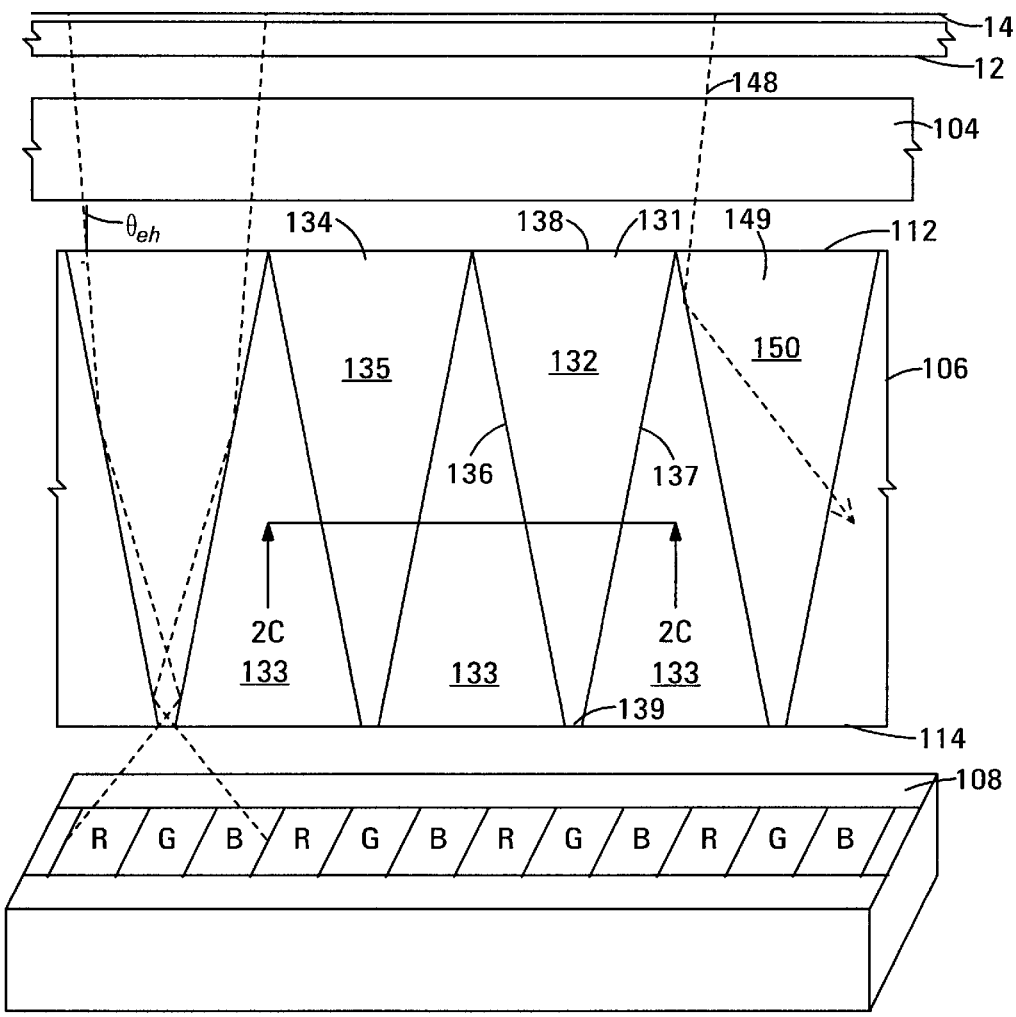
FIG. 2B shows a small part of the scan head and a small part of the first embodiment of the waveguide array according to the invention. In this Figure, and in FIGS. 3A–3D, 4A–4C, 4E and 5, the curvature of the waveguide array has been eliminated to show the shapes of the waveguides more clearly.

FIG. 2A is a side elevation of the scan head 100 incorporating a first embodiment 106 of the waveguide array and FIG. 2B is a front elevation showing a small part of the scan head. In these Figures, the curvature of the waveguide array 106 has been eliminated to allow the waveguides constituting the waveguide array to be depicted more clearly, and the position and orientation of the light sensor array 108 have been changed accordingly. Also, the light source and reflector have been omitted to simplify the drawings. Finally, FIGS. 2A, 2B and the other drawings of waveguide arrays in this disclosure show the width of the waveguides constituting the waveguide array greatly exaggerated relative to the length of the waveguides to enable the structure of the waveguides to be shown more clearly. In the drawings, the waveguides are shown with a length/maximum width ratio of about 1.4:1. A waveguide for use in a 300 dpi scanner has a length/maximum width ratio of about 125:1. Waveguides for use in higher-resolution scanners may have even greater length/maximum width ratios.

Figure 2C:
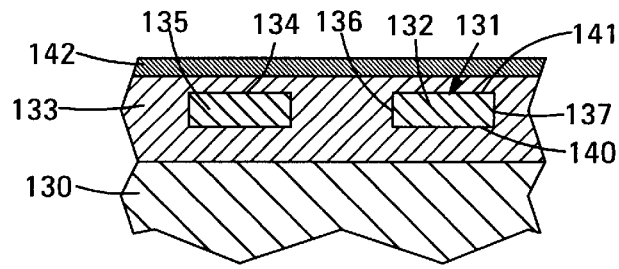
FIG. 2C is a cross-sectional view along the line 2C–2C shown in FIG. 2B.

The waveguide array 106 is composed of a large number of waveguides supported by the flexible substrate 130. The substrate is a layer of a flexible plastic, such as polyethylene terephthelate (PET). An exemplary one of the waveguides is shown at 131. The other waveguides are similar. The waveguide 131 is composed of the core 132 embedded in the cladding 133, as shown in the cross-sectional view of FIG. 2C. Also shown in FIG. 2C is the core 135 of the adjacent waveguide 134. The cores are formed of a flexible, transparent plastic having a high refractive index whereas the cladding is formed of a flexible, transparent plastic having a low refractive index. The cladding is deposited on the substrate 130, and is common to all the waveguides constituting the waveguide array. Alternatively, the cladding may additionally serve as the substrate.

A layer 142 within the cladding 133 remote from the substrate 130 is made light-absorbent to absorb the light rejected from the waveguides constituting the waveguide array 106. The layer may be made light-absorbent by embedding carbon black particles in the material of the cladding, for example. Preferably, the density of the absorbent layer increases with increasing distance from the cores 132 and 135 to reduce reflection by the light-absorbent layer. Alternatively, a light-absorbent overlay (not shown) may be applied to the cladding 133. The material of the light-absorbent overlay should have a refractive index close to that of the material of the cladding to prevent the surface between the light-absorbent overlay and the cladding from reflecting light back into the cladding. Additionally or alternatively, reflection at the cladding/overlay surface can be reduced by roughening the surface of the cladding before the overlay is applied. As a further alternative, an index-matching layer may be substituted for the absorbent layer in parts of the waveguide array remote from the light sensor array to enable the light rejected from the waveguides to escape from the waveguide array.

A layer (not shown) of the cladding 133 adjacent the substrate 130 may additionally or alternatively be made light-absorbent, or a light-absorbent underlay (not shown) may be interposed between the substrate and the cladding.

The light-absorbent layer 142 should be located adjacent the surface of the waveguide array 106 that is convexly curved when the waveguide array is installed in the scan head as shown in FIG. 1B–1F. In arrangements in which the waveguide array is curved in two directions, such as those shown in FIGS. 1C and 1F, two light-absorbent layers are preferably used, one adjacent each surface of the waveguide array. If a waveguide array having one light-absorbent layer is used in an embodiment in which the waveguide curves in two directions, the light-absorbent layer should be located adjacent the surface of the waveguide array that is convexly curved closest to the light sensor array. For example, in the examples shown in FIGS. 1C and 1F, the light-absorbent layer should be located adjacent the surface 143.

The exemplary waveguide 131 will now be described in more detail with reference to FIGS. 2A–2C. The other waveguides are substantially identical. Referring first to FIG. 2B, the core 132 has side walls 136, 137 set at equal and opposite non-zero angles relative to the long axis of the waveguide and give the waveguide its tapered shape. The angle of taper between the side walls and the long axis of the waveguide is about 0.4 degrees. The drawing shows the angle of the taper greatly exaggerated. The core also has end walls 138 and 139 disposed substantially parallel to the input end 112 and the output end 114, respectively, of the waveguide array 106. Finally, the core has a bottom wall 140 and a top wall 141, shown in FIG. 2C.

Light impinging on any of the side walls 136, 137, the bottom wall 140 or top wall 141 of the core 132 will be reflected back into the core if the angle of incidence relative to the perpendicular to the wall is greater than the critical angle $\phi_c$, and will be transmitted through the wall into the cladding 133 if the angle of incidence is less than the critical angle. The sine of the critical angle $\phi_c$ is given by $n_{CLAD}/n_{CORE}$, where $n_{CORE}$ is the refractive index of the high refractive index material of the core and $n_{CLAD}$ is the refractive index of the low refractive index material of the cladding, respectively.

The resolution of the print head 100 in the scan direction 16 depends on the thickness of the core and the maximum acceptance angle $\theta_y$, shown in FIG. 2A, of the waveguides constituting the waveguide array 106. Since the bottom wall 140 and the top wall 141 of the core 132 of the waveguide 131 are parallel, the maximum acceptance angle is equal to $\sin^{-1}(n_{CORE}\cos\phi_c)$. Light that enters the waveguide at an angle relative to the long axis of the waveguide that is greater than the maximum acceptance angle will impinge on the top or bottom wall of the core at an angle less than the critical angle. Such light passes from the core into the cladding 133 and is not transmitted through the waveguide to the light sensor array 108. On the other hand, all light that enters the waveguide at an angle relative to the long axis of the waveguide that is less than the maximum acceptance angle will impinge on the top or bottom wall of the core at more than the critical angle. Such light is reflected by the top and bottom walls of the core and is therefore transmitted through the waveguide to the light sensor array 108.

In the scan direction 16, the acceptance angle $\theta_y$ is in the range of 5°–30°, depending on the refractive indices of the materials of the core 132 and the cladding 133. To obtain an acceptable resolution with such a large acceptance angle would require that the input end 112 of the waveguide array 106 be located very close to the object 14. The platen 12 limits the minimum distance between the object and the input end of the waveguide array. Even if the input end of the waveguide array could be located very close to the object, the scan head would have a very small depth of field.

To overcome this problem, the rod lens 104 is interposed between the platen and the input end of the waveguide array. The optical characteristics of the rod lens and the location of the rod lens relative to the object 14 and the input end 112 of the waveguide array are chosen so that the rod lens forms an image of the strip 20 of the object on the input end of the waveguide array. The image has a width in the scan direction equal to the thickness of the cores of the waveguides constituting the waveguide array. The strip has a width in the scan direction 16 equal to the reciprocal of the resolution of the scanner. Thus, in scanners with resolutions of 300, 600 and 1,200 dpi, the strip 20 has a width in the scan direction of about 80 $\mu$m, 40 $\mu$m and 20 $\mu$m, respectively.

The resolution of the print head 100 in the direction perpendicular to the scan direction 16 is determined by the input width, the critical angle and the taper angle of the cores of the waveguides constituting the waveguide array 106. In a practical embodiment of a scan head for a 300 dpi scanner, which has a resolution of 12 points/mm, the waveguide array is composed of some 5100 waveguides in a width of 220 mm. The core of each waveguide is about 10 mm long, 80 $\mu$m wide at its input end, and 10 $\mu$m wide at its output end. Since the core of each waveguide is highly elongate, light passing through the core is reflected a number of times. Each time light is reflected from one of the side walls 136, 137 of the core, the angle of incidence for the next reflection is increased by the taper angle, i.e., the angle between the side wall and the long axis of the waveguide. For the waveguide to transmit light to the light sensor array 108, the light must impinge on one of the side walls of the core at more than the critical angle $\phi_c$ every time it is reflected. All light that impinges on one of the side walls at more than the critical angle on its last reflection before leaving the output end 114 of the waveguide will leave the output end of the waveguide, and will therefore be transmitted to the light sensor array. For light to be reflected at more than the critical angle at its last reflection, the light must enter the waveguide substantially parallel to the long axis of the waveguide so that the angle of incidence after several reflections will remain greater than the critical angle at the last reflection. In the embodiment described above, the effective acceptance angle $\theta_{eh}$ is in the range of 2°–30°. This enables the scan head to have a resolution substantially equal to the pitch of the waveguide array, i.e., 80 $\mu$m in the above example, with the waveguide array located at a practical distance from the object.

FIG. 2B also shows the ray 148 that enters the waveguide 149 at an angle greater than the acceptance angle $\phi_{eh}$. This ray passes through the side wall of the core 150 of the waveguide after its first reflection, and the waveguide 149 therefore does not transmit this ray to the light sensor array 108. However, such a ray may pass through the waveguide array 106 at an oblique angle and may impinge on one or more of the light sensors of the light sensor array 108. The electrical signal generated by the light sensor in response to the ray represents an error in the representation of the object by the electrical signal generated by the light sensor array. This problem is eliminated by curving the waveguide array as shown in FIG. 1B. Light that is rejected by a waveguide propagates in a straight line. Since the waveguide is curved, the straight-line path of the rejected light intercepts the light-absorbent layer 142 (FIG. 2C) in the cladding 133. The light-absorbent layer absorbs the rejected light and prevents it from reaching the light sensor array. Thus, curving the waveguide array prevents the light that is rejected from the waveguides from causing errors in the electrical signal representing the object.

Photolithography or embossing techniques are known in the art for fabricating waveguide arrays in large volumes and at low cost using plastic materials of different refractive indices. See, for example, U.S. Pat. No. 3,767,445 of Chandross et al. and U.S. Pat. No. 5,462,700 of Beeson et al., the entire disclosures of which are incorporated into this disclosure by reference. Consequently, fabrication of the waveguide array 106 will not be described in detail here. Although the waveguide array is composed of thousands of elements, and is therefore relatively complex, once the masks or embossing plates for fabricating waveguide arrays have been made, waveguide arrays can be mass-produced at a low unit cost, and the tooling costs can be amortized over large numbers of waveguide arrays.

FIG. 1C–1F are side views showing variations of the scan head 100 that illustrate alternative ways of arranging the elements constituting the scan head. The alternative arrangements reduce the effective length of the waveguide array 106 so that the longer waveguide arrays to be described below with reference to FIGS. 3A–3D, 4A–4E and 5 can be accommodated within the overall dimensions of the scan head. Some of the variations change the height/width ratio of the scan head from that shown in FIGS. 1A and 1B. The following variations are simply examples, and are not exhaustive. The elements of the scan head may be arranged in ways different from those shown in response to different dimensional and performance constraints.

Compared with the scan head shown in FIG. 1B, the variation shown in FIG. 1C has a reduced height gained at the expense of a longer length in the scan direction. The waveguide array curves almost continuously in two opposite directions in a serpentine arrangement. Since the waveguide array curves in two directions, it is preferred that a second light-absorbent layer be located adjacent the substrate 130 shown in FIG. 2C in addition to the light-absorbent layer 142. The continuous curvature maximizes the absorption of light rejected by the waveguides constituting the waveguide array. The approximately 180° curve in the waveguide array adjacent the light sensor array 108 preferably has a bending radius of about 10 mm to maximize the absorption of light rejected by the waveguides constituting the waveguide array. This minimizes the amount of rejected light that reaches the light sensor array. In practical embodiments of the scan heads shown in FIGS. 1B–1F, the minimum radius of curvature of the waveguide array is about 10 mm.

The variation shown in FIG. 1D accommodates a substantially longer waveguide array than that shown in FIG. 1B and also has a reduced height but a longer length in the scan direction. The waveguide array has two curved sections interconnected by a short straight section. The curved sections curve in the same direction, which means that the waveguide array can be simpler since it need only include one absorbent layer, as shown in FIG. 2C. Again, this variation includes an approximately 180° curve in the waveguide array adjacent the light sensor array.

The variation shown in FIG. 1E includes the mirror 110 to reflect the light reflected by the object 12 through approximately 90° before the light passes through the rod lens 104 and enters the waveguide array 106. The waveguide array in this variation is almost continuously curved and curves in one direction, as in the variation shown in FIG. 1D. This variation also includes an approximately 90° curve in the waveguide array adjacent the light sensor array 108.

The variation shown in FIG. 1F also includes the mirror 110 to reflect the light reflected by the object 12 through approximately 90° before the light passes through the rod lens 104 and enters the waveguide array 106. The waveguide array in this variation is almost continuously curved in two directions in a serpentine fashion. The maximum angle through which the waveguide array is curved is less than 90° to reduce the overall height of the waveguide array. This reduces the overall height of the scan head, albeit at the expense of an increased length in the scan direction.

In the variations shown in FIG. 1E and 1F, the order of the mirror 110 and the rod lens 104 may be reversed. Also, rod lenses with integrated mirrors are known in the art and may alternatively be used.

A scan head incorporating the embodiment of the waveguide array shown in FIGS. 2A–2C provides good results in 300 dpi (12 points/mm) scanners. Substantial market demand now exists for 600 dpi and 1,200 dpi scanners, i.e., scanners with resolutions of 24 points/mm and 48 points/mm, respectively. The scan heads of conventional-width (220 mm) 600 dpi and 1,200 dpi scanners have waveguide arrays composed of 10,200 and 20,400 waveguides, respectively. The width of the core of each waveguide in the waveguide array is respectively 40 μm and 20 μm at the input end, and 10 μm at the output end. Moreover, while an acceptance angle in the range of 2°–3° is acceptable in a 300 dpi scanner, the scan heads of 600 dpi and 1,200 dpi scanners require acceptance angles in the ranges of 0.5°–1° and 0.25°–0.5°, respectively. The actual acceptance angle depends on the required modulation transfer function (MTF) and depth of field of the scan head. MTF is a measure of the spatial frequency response of the scan head. Such acceptance angles can be obtained using the waveguide array shown in FIGS. 2A and 2B, but may require either or both of a considerable increase in the length of the waveguides and a considerable decrease in the numerical aperture (NA=sin $\phi_c$).

FIGS. 3A–3D show variations on a second embodiment 206 of a waveguide array according to the invention. This embodiment provides the smaller acceptance angles required by the scan heads of 600 dpi and 1,200 dpi scanners. Elements of the waveguide array 206 that correspond to elements of the waveguide array 106 described above with reference to FIGS. 2A–2C are indicated using the same reference numerals and will not be described in detail. Again, only a small part of the waveguide array is shown to simplify the drawings, and the waveguide array has been flattened so that the shapes of its elements can be depicted more clearly. When installed in a scan head, the waveguide array is curved as shown in any of FIGS. 1B–1F. The waveguide array 206 can be substituted for the waveguide array 106 in the scan head 100 shown in FIG. 1A–1F. The construction of the waveguide array 206 is substantially identical to that of the waveguide array 106 and will not be described again in detail.

The exemplary waveguide 231 of the waveguide array 206 will now be described with reference to FIG. 3A. The waveguide 231 is composed of multiple tapered waveguide segments and a rejected light absorption segment arranged in tandem. In the example shown, the waveguide is composed of the three tapered waveguide segments 251, 252 and 253 and the rejected light absorption segment 254, but more or fewer waveguide segments can be used to narrow or widen the acceptance angle, respectively. The core 232 is shaped to include the three tapered sections 255, 256 and 257 and the parallel-sided section 258. The three tapered sections and the parallel-sided section of the core surrounded by the cladding 233 collectively form the three waveguide segments 251–253 and the rejected light absorption segment 254 of the waveguide 231.

The width at the input end of each of the tapered sections 255, 256, 257 of the core 232 is approximately equal to the reciprocal of the required optical resolution. The input end of the tapered section 256 is shown at 259. For example, in a waveguide array for a 600 dpi scanner that has a resolution of 24 points/mm, the width at the input end of each of the tapered sections is (1/24) mm ≈40 μm. The width at the output end of each of the tapered sections is about 10 μm. The width of the parallel-sided section 258 is also about 10 μm.

The length of each of the tapered sections 255, 256, 257 of the core 234 is about 5 mm, and that of the parallel sided section is about 3 mm. This makes the waveguide array 206 about 80% longer than the waveguide array 106 shown in FIG. 2A, but this additional length can be accommodated within the overall dimensions of the scan head 100, as described above with reference to FIGS. 1C–1F.

As noted above, the plane of the waveguide array 206 is curved when the waveguide array is installed in a scan head. The rejected light absorption segment 254 that forms part of each of the waveguides constituting the waveguide array operates together with curvature of the waveguide array and the light-absorbent layer or layers of the waveguide array (142 in FIG. 2C) to prevent light rejected from the waveguide array from reaching the light sensor array 108. The rejected light absorption segment has parallel sides, and will therefore not reject any light that enters it from the tapered waveguide segment 253. The rejected light absorption segment increases the distance between the light sensor array and the point in the waveguide array closest to the light sensor array at which light rejection can occur, i.e., the output end of the tapered waveguide segment 253. Increasing this distance causes all light rejected by the tapered waveguide segment 253 to intercept the light-absorption layer and be absorbed before such light can exit from the output end 214 of the waveguide array and reach the light sensor array.

The waveguide segment 253 has an acceptance angle of about 2°. Light entering the waveguide segment 253 at an angle in the range of plus to minus the acceptance angle relative to the long axis of the waveguide will exit the waveguide segment 253 at an angle in the range of about ±(90–$\phi_c$). Similarly, the waveguide segment 252 has an acceptance angle of about 2°, and light entering this waveguide segment at an angle in the range of plus to minus the acceptance angle will exit the waveguide segment at an angle in the range of about ±(90–$\phi_c$). However, the waveguide segment 253 will transmit only that portion of the light leaving the waveguide segment 252 at an angle that is within the range of plus to minus the acceptance angle of the waveguide segment 253. Accordingly, the effective acceptance angle of the tandem arrangement of the waveguide segments 252 and 253 is substantially smaller than that of either waveguide segment. Moreover, the effective acceptance angle of the tandem arrangement of the three waveguide segments 251, 252 and 253 is smaller than that of the two-segment arrangement just described, and is sufficiently small to meet the acceptance angle requirements of 600 and 1,200 dpi scanners.

In the waveguide array 206 shown in FIG. 3A, the waveguide segment 251 can be regarded as an upstream waveguide segment, since it is located upstream of the waveguide segments 252 and 253. The waveguide segment 253 can be regarded as a downstream waveguide segment, since it is located downstream of the waveguide segments 251 and 252. The waveguide segment 252 is both an upstream waveguide segment and a downstream waveguide segments since it is upstream of the waveguide segment 253 and is downstream of the waveguide segment 251.

In the waveguide array 206, the input ends of the waveguide segments 252 and 253 provide a path through which light rejected by the waveguide segments 251, 252 located upstream of them or through which light rejected by an upstream waveguide segment of other waveguides in the waveguide array can re-enter the waveguide 231 and be transmitted to the light sensor array (108 in FIG. 1A and 1B). Light rejected by an upstream waveguide segment is outside the acceptance angle of the waveguide segment. Consequently, such light re-entering a waveguide and being transmitted to the light sensor array degrades the resolution of the scanner. For example, FIG. 3A shows the ray 248 that enters the waveguide array 206 at an angle greater than the acceptance angle of the upstream waveguide segment 251 of the waveguide 231. This ray is rejected by the upstream segment 251, and passes through the cladding 233 to re-enter waveguide 231 through the input end 259 of the core 256 of the downstream waveguide segment 252. Refraction changes the path of the ray 248 so that the ray enters the waveguide segment 252 at an angle less than the acceptance angle of the tandem arrangement of waveguide segments 252 and 253. Consequently, the waveguide segments 252 and 253 transmit the ray 248 to the light sensor array (not shown). The electrical signal generated by the light sensor array in response to the ray 248 then degrades the resolution of the scanner.

Degradation of the resolution of the scanner can be prevented by stopping light rejected by an upstream waveguide segment from re-entering the waveguides of the waveguide array through the input end of a downstream waveguide segment. Consequently, the variations shown in FIGS. 3B–3D on the waveguide array shown in FIG. 3A include blockers located between adjacent waveguides to prevent light rejected by an upstream waveguide segment from being transmitted to the light sensor array.

In the examples shown in FIGS. 3B and 3C, refractive islands composed of a transparent material that has a higher refractive index material than that of the material of the cladding 233 are used as blockers. The refractive islands are embedded into the cladding between the tapered sections of the cores of the upstream waveguide segments of adjacent waveguides. In the example shown in FIG. 3B, the refractive islands 260 are triangular and are located between the tapered sections of the cores of the upstream waveguide segments of the adjacent waveguides 231 and 249. In the example shown in FIG. 3C, the refractive islands are composed of triangular arrays 261 of circular refractive islands of a transparent material that has a higher refractive index than that of the cladding 233. The arrays are located between the tapered sections of the cores of the upstream waveguide segments of the adjacent waveguides 231 and 249. In the example shown, one of the triangular arrays is shown composed of the circular refractive islands 262.

In both of the examples shown in FIGS. 3B and 3C, the refractive islands of higher refractive index material embedded in the cladding 233 refract the ray 248 to increase the angle of incidence of the ray on the side walls of any of the downstream segments. As a result, the ray 248, after rejection by the waveguide segment 251, is transmitted generally laterally through the waveguide array until the curvature of the waveguide array, shown in FIG. 1B–1F, causes the light beam to intercept the light-absorbent layer 142, shown in FIG. 2C. The ray 248 is shown being absorbed at 263. Absorption of the ray prevents the ray from reaching the light sensor array. The refractive islands can have shapes different from those shown in FIGS. 3B and 3C as long as they serve to increase the angle of incidence of the light transmitted by the side walls of the upstream waveguide segments.

In the examples shown in FIGS. 3B and 3C, the refractive islands 260 and 262 are preferably fabricated from the same material as the core 232. This enables the shapes of the refractive islands to be defined in the same operation as the shapes of the cores of the waveguides simply by modifying the tooling. The refractive islands are dimensioned to leave a margin of the cladding 233 between the core and the island.

In the example shown in FIG. 3D, elongate absorbent regions located in the cladding 234 substantially parallel to the side walls of the tapered sections of the upstream waveguide segments are used as blockers. In the example, the elongate absorbent regions 264 are located in the cladding 233 disposed substantially parallel to the side walls of the tapered sections 255, 256 of the core of the upstream waveguide segments 251, 252 of the waveguide 231. Each absorbent region is inset from the core to leave a region of the cladding between it and the core. Each absorbent region may be an elongate piece of a light-absorbent plastic or other material. FIG. 3D shows an example in which a triangular piece 265 of light-absorbent plastic provides the elongate light-absorbent regions 264 for the two adjacent waveguide segments 255 and 257. Alternatively, an elongate region of the cladding may be made light-absorbent by adding particles of a light-absorbent material, such as carbon black, to the cladding material before the cladding material is cured.

As a further alternative, a light-absorbent region may be formed by filling most of the region of the cladding 233 between adjacent waveguides with light-absorbent material, leaving a thin region of transparent cladding material between the side wall of the core and the light-absorbent material. The light-absorbent material may be a piece of light-absorbent plastic or other material. Alternatively, a region of the cladding between adjacent waveguide segments may be made light-absorbent by adding particles of a light-absorbent material, such as carbon black, to the cladding material before the cladding material is cured.

In the example shown in FIG. 3D, the light-absorbent region 264 is shown absorbing the ray 248 rejected by the waveguide segment 251 at a location close to the exit point of the ray from the waveguide 231. The light-absorbent region prevents the ray from re-entering any of the waveguides and reaching the light sensor array (not shown).

Figure 4A:
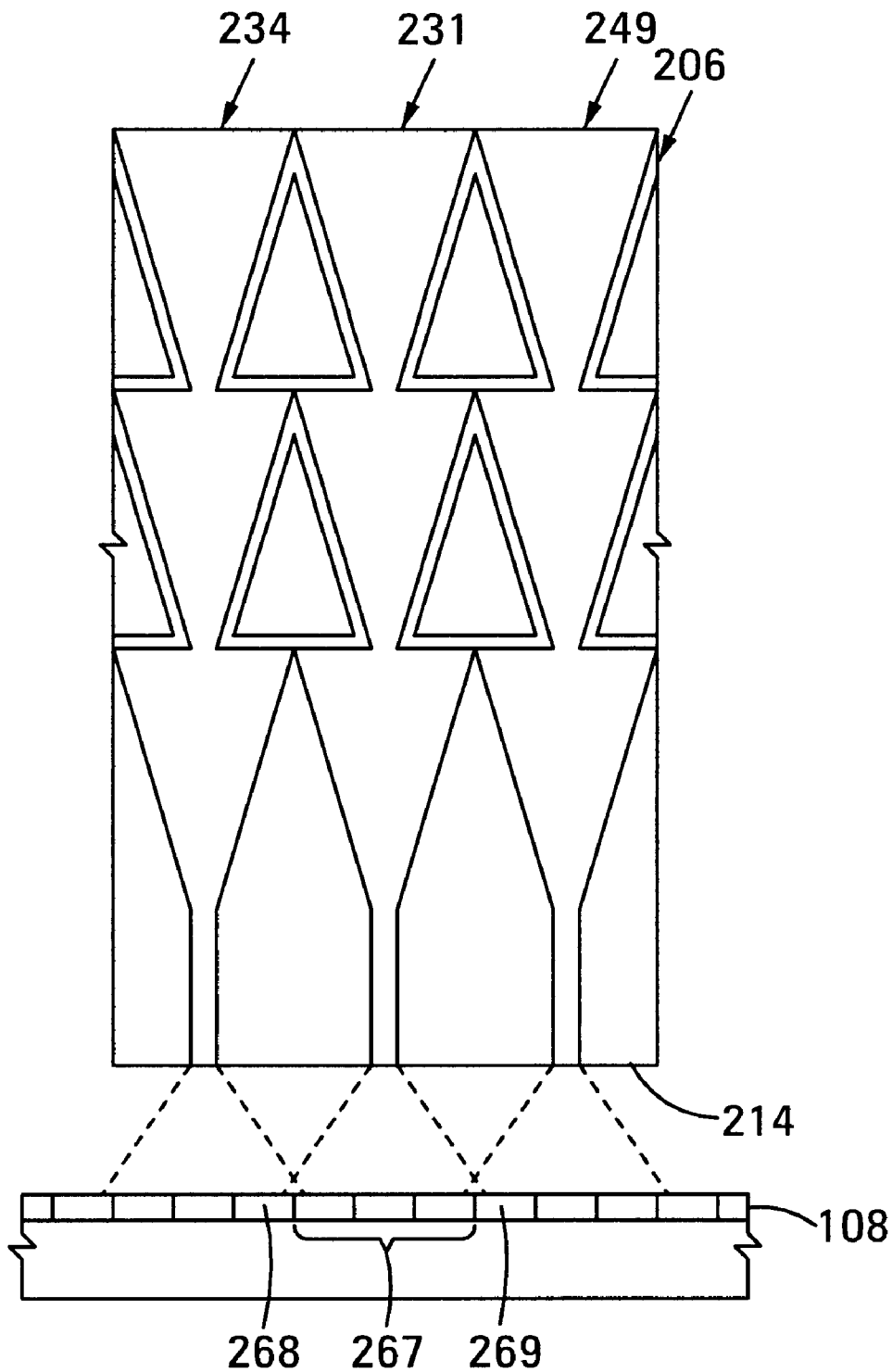
FIG. 4A is a front elevation of an embodiment of a waveguide array according to the invention for illustrating how the light output by one of the waveguides constituting the waveguide array can fall on not only the pixels belonging to the waveguide, but also on the pixels belonging to adjacent waveguides.

The higher resolution of 600 and 1,200 dpi scanners requires that the size of the pixels of the light sensor arrays be reduced compared with those of a 300 dpi scanner. Light leaves the output ends of the waveguides constituting the waveguide array 206 at angles in the range of about $\pm \sin^{-1}(n_{CORE} \cos \phi_c)$, i.e., in the range of approximately $\pm 5°$ to $\pm 30°$. This means that the width of the light beam output by each of the waveguides progressively increases with increasing distance from the end of the waveguide array. Unless the light sensor array 108 is mounted very close to the output end 214 of the waveguide array 206, the light from one waveguide will fall on the pixels of the light sensor array belonging to the adjacent waveguide. FIG. 4A shows how the light output by the waveguide 231 falls on not only the pixels 267 belonging to the waveguide 231, but also falls on the pixels 268 and 269 belonging to the adjacent waveguides 234 and 249, respectively.

The spread of the light output by the waveguides constituting the waveguide array can be reduced by feeding the light output by each waveguide to a collimator.

FIG. 4B shows part of an embodiment 306 in which each of the waveguides constituting the waveguide array is formed to include a collimator at its output end. Elements corresponding to the embodiments shown in FIGS. 2A–2B and 3B are shown using the same reference numerals and will not be described again. The alternative blockers shown in FIGS. 3C and 3D may be substituted for the FIG. 3A-type blockers 260 shown in FIG. 4B.

The collimator 372 that forms part of the exemplary waveguide 331 will now be described. The collimator is arranged in tandem with the rejected light absorption segment 354. The collimator is formed by shaping the core 332 additionally to include the inverse tapered section 374. The input end 376 of the inverse tapered section is equal in width to the parallel-sided section 358. The output end 378 of the inverse tapered section is shown approximately equal in width to the input end of the waveguide 331, but may be narrower than this. In a practical embodiment, the length of the inverse tapered section was in the range of 1–3 mm.

Light is output by the collimator 372 at angles in the range from about ±(20–5°). The output end 314 of the waveguide array 306 is preferably attached to the light sensor array 108 using a transparent adhesive having a refractive index of about 1.5. With the collimator and the transparent adhesive, the output end of the waveguide array can be mounted as far as 40µm from the light sensor array with negligible amounts of light falling on pixels of the light sensor array belonging to adjacent waveguides.

The collimator 372 only reduces spreading of the light output by the waveguides constituting the waveguide array 306 in the direction perpendicular to the scan direction 16 (FIG. 1B), i.e., in the plane of the waveguide array. The light output by the waveguides also spreads in the scan direction, i.e., in the plane perpendicular to the plane of the waveguide array. The signal-to-noise ratio of the electrical signal generated by the light sensor array 108 is reduced if part of the light output by the waveguide array falls outside the active area of the pixels of the light sensor array. FIG. 4C is a side view of the arrangement shown in FIG. 4B which shows part of the light output by the waveguide array falling outside the active area of the pixels in the light sensor array 108. An exemplary pixel of conventional height is shown at 380. The signal-to-noise ratio of the electrical signal generated by the light sensor array may be restored by increasing the height of the pixels. An exemplary pixel of increased height is shown at 381.

The spreading of the light output by the waveguides constituting the waveguide array 306 in the direction perpendicular to the scan direction 16 (FIG. 1B) may be exploited by using the modified light sensor array 308, a small section of which is shown in FIG. 4D. In this, the pixel 384 of the light sensor array 308 illuminated by the light output by the collimator 372 is divided into a two-dimensional array of sub-pixels. Each of the sub-pixels includes a red, green or blue color filter. An exemplary sub-pixel that includes a red color filter is shown at 385. The color of the color filter included in each of the sub-pixels in the array is indicated by the letters R, G and B. The array includes equal numbers of sub-pixels having red, green and blue color filters so that color balance is maintained. Using a large number of small sub-pixels to detect the light output by each of the waveguides constituting the waveguide array 306 reduces the effect of misaligning the light sensor array 308 relative to the waveguide array 306. The light sensor array 308 may be used instead of the light sensor array 108 in the other embodiments described in this disclosure.

In the embodiments shown in FIGS. 4B–4D, the output end 314 of the waveguide array 306 is mounted very close to the light sensor array 108. For example, the light sensor array may be attached to the output end of the waveguide array using an index-matching transparent adhesive. The collimator 372 shown in FIG. 4B reduces the spread of the light output by the waveguides constituting the waveguide array 306 in the plane of the waveguide array, but does not reduce the spread in the direction perpendicular to the plane of the waveguide array. This limits the maximum distance at which the light sensor array can be mounted from the output end of the waveguide array.

The distance at which the light sensor array 108 is mounted from the output end 314 of the waveguide array 306 can be increased by interposing the rod lens 386 between the output end of the waveguide array and the light sensor array, as shown in FIG. 4E. The rod lens forms an image of the output ends of the cores of the waveguides constituting the waveguide array on the active area of the light sensor array, so that all of the light output by the waveguides falls on the pixels of the light sensor array. The optical characteristics of the rod lens 386 and the location of the rod lens relative to the light sensor array 108 and the output end 314 of the waveguide array are chosen so that the image of the output ends of the cores of the waveguides covers the pixels of the light sensor array. The rod lens has a negligible effect on the collimation provided by the collimator 372 in the plane of the waveguide array.

Figure 5:
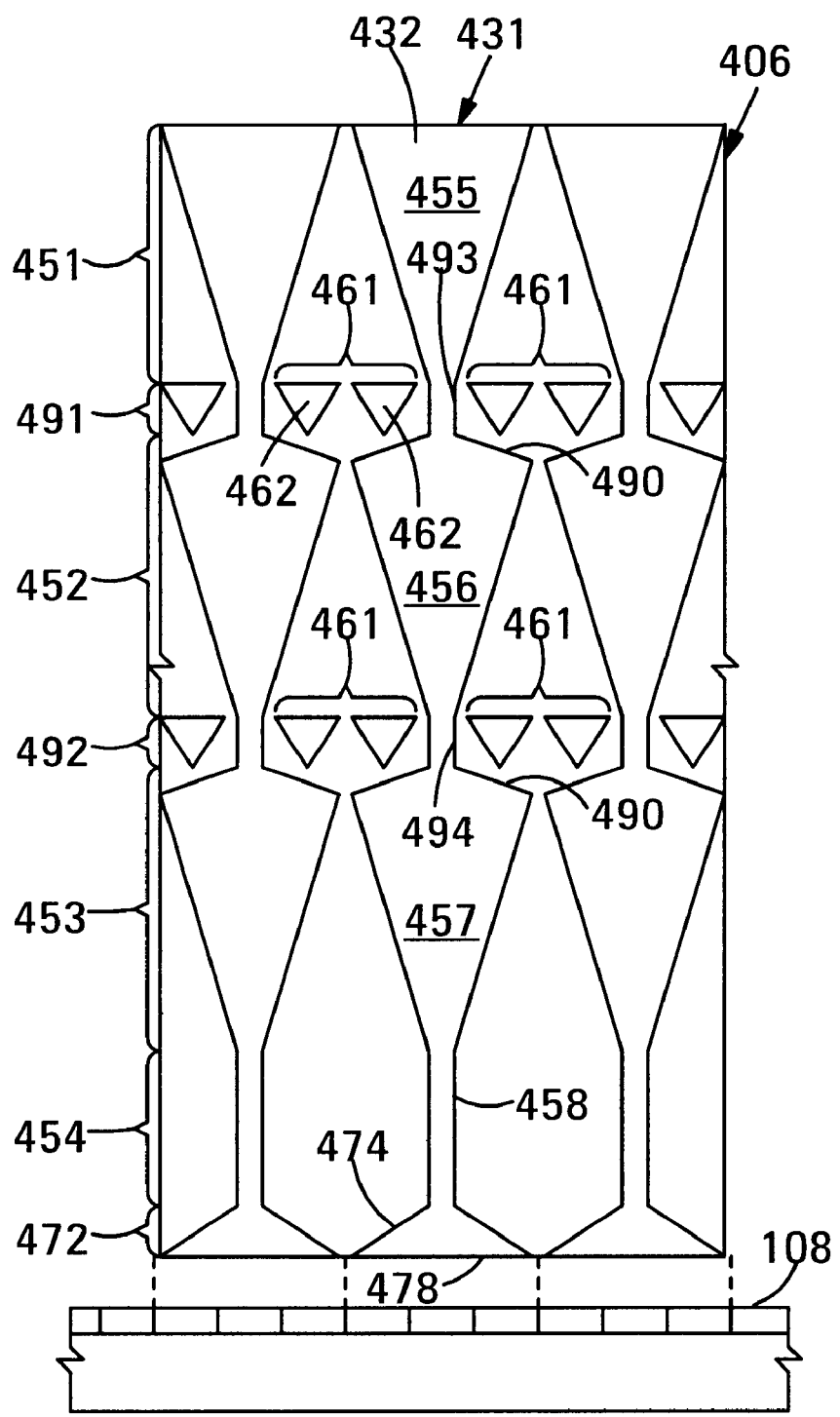
FIG. 5 is a front elevation of a preferred embodiment of a waveguide array according to the invention.

FIG. 5 shows an example of part of the waveguide array 406 of a practical embodiment of a scan head. The waveguide array 406 can be substituted for the waveguide array 106 in the scan head variations shown in FIG. 1A–1F. The construction of the waveguide array 406 is substantially identical to that of the waveguide array 106 and will not be described again in detail.

The exemplary waveguide 431 of the waveguide array 406 will now be described. The waveguide 431 is composed of multiple tapered waveguide segments, multiple coupling segments, a rejected light absorption segment and a collimator all arranged in tandem. In the example shown, the waveguide is composed of the three tapered waveguide segments 451, 452 and 453, the parallelsided coupling segments 491 and 492, the parallel-sided rejected light absorption segment 454 and the inverse-tapered collimator segment 472. The waveguide may include more or fewer tapered waveguide segments to narrow or widen the acceptance angle, respectively.

The tapered waveguide segments 452 and 453 each include a sloping shoulder 490 to make the waveguide segments easier to manufacture.

The coupling segment 491 couples the light output by the tapered waveguide segment 451 to the tapered waveguide segment 452, and the coupling segment 492 couples the light output by the tapered waveguide segment 452 to the tapered waveguide segment 453.

The rejected light absorption segment 454 is similar to the light absorption segment 254, described above, and the collimator 472 is similar to the collimator 372, described above. Consequently, these elements will not be described again.

The core 432 is shaped to include the three tapered sections 455, 456 and 457, the parallel-sided section 494 between the tapered sections 455 and 456, the parallel-sided section 495 between the tapered sections 456 and 457, the parallel-sided section 458, and the inverse-tapered section 474. The three tapered sections, the parallel-sided sections and the inverse tapered section of the core surrounded by the cladding 433 collectively form the three waveguide segments 451–53, the coupling segments 491 and 492, the rejected light absorption segment 454 and the collimator 472 of the waveguide 431.

The width at the input end of each of the tapered sections 455, 456, 457 of the core 432 is approximately equal to the reciprocal of the required resolution. For example, in a waveguide array for a 600 dpi scanner that has a resolution of 24 points/mm, the width at the input end of each of the tapered sections is (1/24) mm ≈40 µm. The width at the output end of each of the tapered sections is about 10 µm. The width of the parallel-sided sections 493, 494 and 458 is also about 10 µm. The width of the collimator is about 10 µm at its input end and is approximately equal to the reciprocal of the resolution at its output end 478, but may be narrower than this at its output end.

In a practical embodiment, the length of each of the tapered sections 455, 456, 457 of the core 434 was about 5 mm. Of the length of the tapered sections 456 and 456, the sloping shoulder 490 accounted for about 90 µm. The length of the parallel-sided sections 493 and 494 constituting the coupling segments 491 and 492 was about 0.5 mm and that of the parallel-sided section 458 constituting the rejected light absorption segment was about 3 mm. The length of the collimator 472 was about 1 mm. These dimensions make the waveguide array 406 about twice as long as the waveguide array 106 shown in FIG. 2A, but the additional length can be accommodated within the overall dimensions of the scan head 100, as described above with reference to FIG. 1C–1F.

To prevent light rejected by the upstream tapered waveguide segments 451 and 452 from re-entering the downstream waveguide segments of the waveguide 431 or another waveguide, blockers are located between adjacent waveguides. In the preferred embodiment, the blockers are composed of the two-element arrays 461 of refractive islands located adjacent each of the coupling segments 491 and 492. Each of the arrays is composed of the two triangular refractive islands 462. The refractive islands are formed of a transparent material having a higher refractive index than that of the cladding. In the practical embodiment, the refractive islands were formed of the same material and in the same manufacturing operation as the cores of the waveguides constituting the waveguide array.

Although this disclosure describes illustrative embodiments of the invention in detail, it is to be understood that the invention is not limited to the precise embodiments described, and that various modifications may be practiced within the scope of the invention defined by the appended claims.

I claim:

1. A scan head for scanning an object in a scan direction, the scan head comprising:
    an elongate light source disposed perpendicular to the scan direction;
    an elongate light sensor array disposed parallel to the light source; and
    a planar waveguide array including an input end and an output end, the input end being located to receive light from the light source reflected by the object, the output end being located adjacent the light sensor array, the waveguide array being curved about an axis parallel to length wise direction of the light source, the waveguide array including:
        tapered waveguides linearly arrayed in an array direction parallel to the light source, each of the waveguides having a width in the array direction that decreases towards the output end of the waveguide array.

2. The scan head of claim 1, additionally comprising a rod lens disposed parallel to the light source, the rod lens being arranged to form an image of a narrow strip of the object on the input end of the waveguide array.

3. The scan head of claim 2, in which each of the waveguides includes a tandem arrangement of tapered waveguide segments, each of the waveguide segments having a width that progressively decreases towards the output end of the waveguide array.

4. The scan head of claim 3, in which the waveguide array additionally includes blockers located between adjacent ones of the waveguides.

5. The scan head of claim 4, in which the blockers include islands of refractive material.

6. The scan head of claim 5, in which:
    the waveguides comprise a core surrounded by cladding, the core being formed of a core material having a higher refractive index than the cladding; and
    the islands comprise core material surrounded by the cladding.

7. The scan head of claim 4, in which the blockers include absorbent material.

8. The scan head of claim 3, in which each of the waveguides additionally includes a first parallel-sided segment arranged in tandem with the tapered waveguide segments, the first parallel-sided segment being located between the output end of the waveguide array and a one of the tapered waveguide segments located closest to the output end of the waveguide array.

9. The scan head of claim 8, in which each of the waveguides additionally includes second parallel-sided segments arranged in tandem with the tapered waveguide segments, the second parallel-sided segments being located between adjacent ones of the tapered waveguide segments.

10. The scan head of claim 9, in which the waveguide array additionally includes blockers located adjacent at least one of the second parallel-sided segments between adjacent ones of the waveguides.

11. The scan head of claim 10, in which:
    the waveguides comprise a core surrounded by cladding, the core being formed of a core material having a higher refractive index than the cladding; and
    the blockers comprise arrays of two triangular islands of core material surrounded by the cladding.

12. The scan head of claim 8, in which each of the waveguides additionally includes an inverse-tapered segment arranged in tandem with the tapered waveguide segments and the first parallel-sided segment, the inverse-tapered segment being located between the first parallel-sided segment and the output end of the waveguide array.

13. The scan head of claim 12, in which:
    the light sensor array includes a light-sensitive surface;
    the rod lens is a first rod lens; and
    the scan head additionally comprises a second rod lens located between the waveguide array and the light sensor array, the second rod lens being arranged to form an image of the output end of the waveguide array on the light-sensitive surface of the light sensor array.

14. The scan head of claim 2, additionally comprising an elongate mirror disposed parallel to the light source between the object and the input end of the waveguide array.

15. The scan head of claim 1, in which the waveguide array includes a layer of absorbent material adjacent a surface of the waveguide array that is convexly curved when the waveguide array is curved about the axis.

16. The scan head of claim 1, in which:

the axis is first axis; and the waveguide array is curved about the first axis in a first direction and is additionally curved about a second axis, parallel to the first axis, in a direction opposite to the first direction.

17. The scan head of claim 1, in which:

light output by each of the waveguides constituting the waveguide array illuminates a pixel of the light sensor array; and the pixel is divided into sub-pixels each including a color filter of different one of at least three colors.

18. The scan head of claim 17, in which the sub-pixels are arranged in a two-dimensional array.

19. A waveguide array, comprising:

tapered waveguides linearly arrayed in an array direction, each of the waveguides having a width that decreases between an input end and an output end, and including:
a tandem arrangement of tapered waveguide segments, each of the waveguide segments having a width that progressively decreases towards the output end of the waveguide.

20. The waveguide array of claim 19, additionally comprising blockers located between adjacent ones of the waveguides.

21. The waveguide array of claim 19, in which each of the waveguides additionally includes a first parallel-sided segment arranged in tandem with the tapered waveguide segments, the first parallel-sided segment being located between the output end of the waveguide array and a one of the tapered waveguide segments located closest to the output end of the waveguide array.

22. The waveguide array of claim 21, in which each of the waveguides additionally includes second parallel-sided segments arranged in tandem with the tapered waveguide segments, the second parallel-sided segments being located between adjacent ones of the tapered waveguide segments.

23. The waveguide array of claim 21, in which each of the waveguides additionally includes an inverse-tapered segment arranged in tandem with the tapered waveguide segments and the first parallel-sided segment, the inverse-tapered segment being located between the first parallel-sided segment and the output end of the waveguide array.

* * * * *